(12) United States Patent
Ihana et al.

(10) Patent No.: US 10,197,164 B2
(45) Date of Patent: Feb. 5, 2019

(54) BUTTERFLY VALVE (71) Applicant: Mitsubishi Electric Corporation, Tokyo (JP)

(72) Inventors: Naoki Ihana, Tokyo (JP); Satoru Hasegawa, Tokyo (JP); Katsunori Takai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 196 days.

(21) Appl. No.: 15/031,560

(22) PCT Filed: Nov. 26, 2013

(86) PCT No.: PCT/JP2013/081787
§ 371 (c)(1),
(2) Date: Apr. 22, 2016

(87) PCT Pub. No.: WO2015/079495
PCT Pub. Date: Jun. 4, 2015

(65) Prior Publication Data
US 2016/0273661 A1    Sep. 22, 2016

(51) Int. Cl.
*F16K 1/22*     (2006.01)
*F16C 33/38*    (2006.01)
*F16C 33/46*    (2006.01)
*F16C 35/06*    (2006.01)
*F16C 35/04*    (2006.01)
*F16C 35/077*   (2006.01)
*F02D 9/10*     (2006.01)
*F02M 26/70*    (2016.01)
*F16C 35/067*   (2006.01)

(52) U.S. Cl.
CPC .............. *F16K 1/225* (2013.01); *F02D 9/106* (2013.01); *F02M 26/70* (2016.02); *F16C 35/045* (2013.01);
(Continued)

(58) Field of Classification Search
CPC ...... F16K 1/2028; F16K 1/2035; F16K 1/224; F16K 1/225; F16C 33/3806;
(Continued)

(56) References Cited

U.S. PATENT DOCUMENTS 3,841,721 A * 10/1974 Coutant .................. F16C 35/06
                                                193/37
4,611,934 A *  9/1986 Piotrowski ............. B23Q 1/265
                                                384/517
(Continued)

FOREIGN PATENT DOCUMENTS

JP    3-249420 A    11/1991
JP    6-264777 A     9/1994
(Continued)

*Primary Examiner* — Reinaldo Sanchez-Medina
*Assistant Examiner* — Hailey K Do
(74) *Attorney, Agent, or Firm* — Birch, Stewart, Kolasch & Birch, LLP (57) ABSTRACT

A bearing holding structure has a substantially cylindrical sleeve and a plate-shaped pressing plate. A tubular portion of the sleeve includes a housing press-fit portion having an outer peripheral surface to be press-fit into a recess of an upper housing, and a bearing press-fit portion having an inner peripheral surface to be press-fit thereinto by a bearing. A pullout prevention portion that protrudes inward to prevent pullout of the bearing is formed at one end of the tubular portion, and the pressing plate is press-fit into the other end thereof.

8 Claims, 8 Drawing Sheets

(52) U.S. Cl.
CPC ............ *F16C 35/077* (2013.01); *F16K 1/224* (2013.01); *F16C 33/3806* (2013.01); *F16C 33/4605* (2013.01); *F16C 35/042* (2013.01); *F16C 35/067* (2013.01); *F16C 2226/12* (2013.01); *F16C 2361/91* (2013.01)

(58) Field of Classification Search
CPC .... F16C 33/4605; F16C 35/04; F16C 35/042; F16C 35/045; F16C 35/06; F16C 35/067; F16C 35/07; F16C 35/077; F16C 35/12; F16C 2226/12; F16C 19/06; F16C 19/54; F16C 33/586; Y10T 29/49696; Y10T 29/4968; Y10T 29/49698
See application file for complete search history.

(56) References Cited

U.S. PATENT DOCUMENTS

| | | | | |
|---|---|---|---|---|
| 4,634,300 | A | * | 1/1987 | Takebayashi ........... F16C 19/26 384/492 |
| 5,061,091 | A | * | 10/1991 | Shiratori ................ B65G 39/12 384/539 |
| 5,112,147 | A | * | 5/1992 | Imamura ............ G11B 19/2009 384/493 |
| 6,027,251 | A | * | 2/2000 | Tsai ...................... A63F 7/0672 273/108.52 |
| 6,099,410 | A | | 8/2000 | Mizutani |
| 6,322,254 | B1 | | 11/2001 | Schwinghammer et al. |
| 8,534,924 | B2 | * | 9/2013 | Zwarts ................ B60B 27/0005 301/105.1 |
| 2008/0025655 | A1 | * | 1/2008 | Creviston ............... F16C 19/52 384/45 |
| 2009/0001245 | A1 | | 1/2009 | Katougi et al. |
| 2013/0340731 | A1 | * | 12/2013 | Kobayashi ............ F16K 31/535 123/568.18 |

FOREIGN PATENT DOCUMENTS

| | | |
|---|---|---|
| JP | 11-166551 A | 6/1999 |
| JP | 2008-57657 A | 3/2008 |
| JP | 2008-101720 A | 5/2008 |
| JP | 2009-8155 A | 1/2009 |
| JP | 2009-127693 A | 6/2009 |
| JP | 2010-71458 A | 4/2010 |
| JP | 2013-96305 A | 5/2013 |
| WO | WO 2006/092256 A1 | 9/2006 |

* cited by examiner

BUTTERFLY VALVE

TECHNICAL FIELD

The present invention relates to a bearing holding structure for fixing to a housing a bearing that pivotally supports a support shaft of a butterfly valve.

BACKGROUND ART

A butterfly-type exhaust gas circulation valve that circulates exhaust gas of an engine to an air supply passage is composed of a valve element that opens and closes an exhaust gas passage and a support shaft that causes the valve element to operate, and the support shaft is supported by a bearing (bearing portion) provided in a housing so as to be rotatable about itself. In the exhaust gas circulation valve having the above configuration, displacement and tilting of the support shaft directly lead to leakage of circulated exhaust gas in a state in which the valve element abuts on a valve seat, and hence it is extremely important to hold the bearing at a predetermined position.

A typical exhaust gas circulation valve is constituted by an aluminum housing, and hence there is a problem in that a holding force becomes insufficient when the bearing is press-fit into the aluminum housing and fixed.

To cope with this, Patent Document 1, for example, proposes a method of fixing a rolling bearing in which a bearing is fixed to the housing by using another component. A rolling bearing fixing device according to Patent document 1 has a structure in which an outer ring of the rolling bearing is fixed to a housing by using the following: the housing; the rolling bearing (bearing) in which a plurality of rolling elements are disposed between the outer ring and an inner ring so as to be rollable in a circumferential direction; a pair of annular fixing plates that sandwich the housing in an axial direction therebetween and hold both ends of the outer ring therebetween; and a bolt that couples the pair of fixing plates via the housing in the axial direction.

CITATION LIST

Patent Document

Patent Document 1: Japanese Patent Application Laid-open No. 2009-8155

SUMMARY OF THE INVENTION

Problems to be Solved by the Invention

In Patent Document 1 described above, since the rolling bearing is held by providing a stepped portion at both ends of the outer peripheral surface of the outer ring in the axial direction, providing a protrusion on each of the inner peripheral surfaces of the pair of fixing plates, and causing the stepped portions and the protrusions to engage with each other, there is a problem in that machining accuracy of the stepped portions and the protrusions is required in order to position the rolling bearing.

In addition, since the rolling bearing is sandwiched between the pair of fixing plates from both end sides of the outer ring in the axial direction, spaces for allowing insertion of the plate are required on both end sides in the axial direction, and hence there is a problem also in that it is difficult to use the rolling bearing fixing device in a housing that has a shape in which one side in the axial direction is closed.

The present invention has been made in order to solve the above problems, and an object thereof is to provide a bearing holding structure having a high holding force and a high positioning function.

Means for Solving the Problems

A bearing holding structure for a butterfly valve of the present invention includes a sleeve including a tubular portion provided with a housing press-fit portion having an outer peripheral surface to be press-fit into the housing and a bearing press-fit portion having an inner peripheral surface to be press-fit thereinto by the bearing, and a pullout prevention portion that protrudes inward at one end of the tubular portion to prevent pullout of the bearing.

A bearing holding structure for a butterfly valve of the invention includes a sleeve including a tubular portion provided with a bearing press-fit portion having an inner peripheral surface to be press-fit thereinto by the bearing and a pullout prevention portion that protrudes inward on one end side of the tubular portion to prevent pullout of the bearing, and a pressing plate having one end side of an outer peripheral surface that forms a housing press-fit portion to be press-fit into the housing and another end side of the outer peripheral surface that is press-fit into an opening end of the sleeve on a side opposite to the pullout prevention portion to prevent pullout of the bearing.

Effect of the Invention

According to the present invention, when the bearing is press-fit into the inner peripheral surface of the sleeve to be held, a high holding force is obtained. In addition, when the outer peripheral surface of the sleeve into which the bearing is press-fit is press-fit into the housing, it is possible to perform positioning of the bearing. Further, mounting of the sleeve to the housing is performed from one direction, and hence it is possible to adopt the bearing holding structure in a housing having a shape in which one side of the bearing in an axial direction is closed.

According to the invention, when the bearing is press-fit into the inner peripheral surface of the sleeve to be held, the high holding force is obtained. In addition, when one end side of the pressing plate is press-fit into the inner peripheral surface of the sleeve, and the other end side thereof is press-fit into the housing, it is possible to perform the positioning of the bearing. Further, mounting of the sleeve and the pressing plate to the housing is performed from one direction, and hence it is possible to adopt the bearing holding structure in the housing having the shape in which one side of the bearing in the axial direction is closed.

BEST MODE FOR CARRYING OUT THE INVENTION

Hereinbelow, in order to describe the present invention in greater detail, the best mode for carrying out the present invention will be described according to the accompanying drawings.

Embodiment 1

Figure 1:
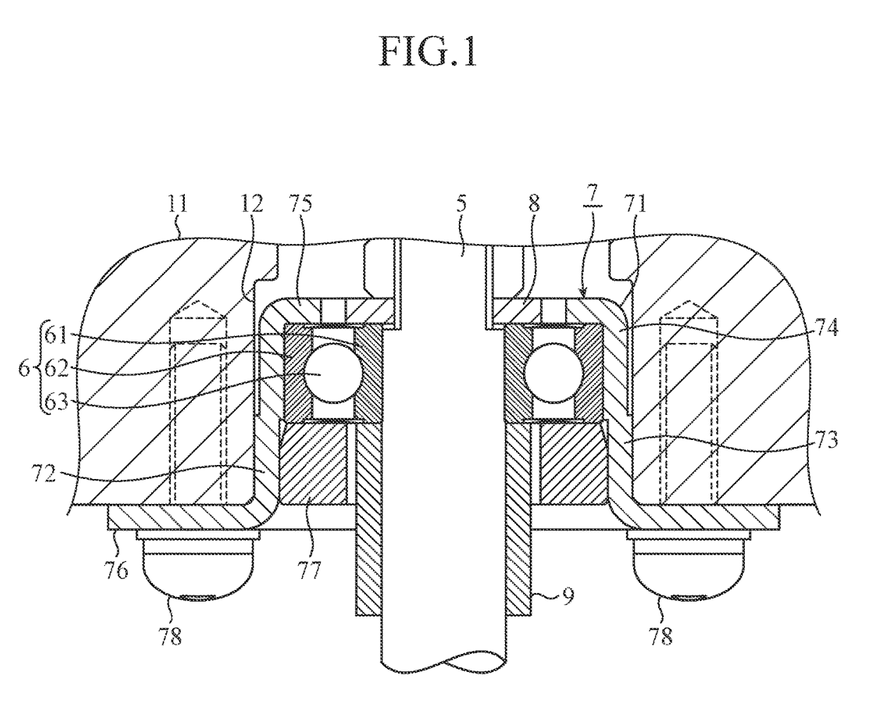
FIG. 1 is a cross-sectional view showing a state in which a bearing holding structure according to Embodiment 1 of the present invention is mounted to a butterfly valve.
Figure 2:
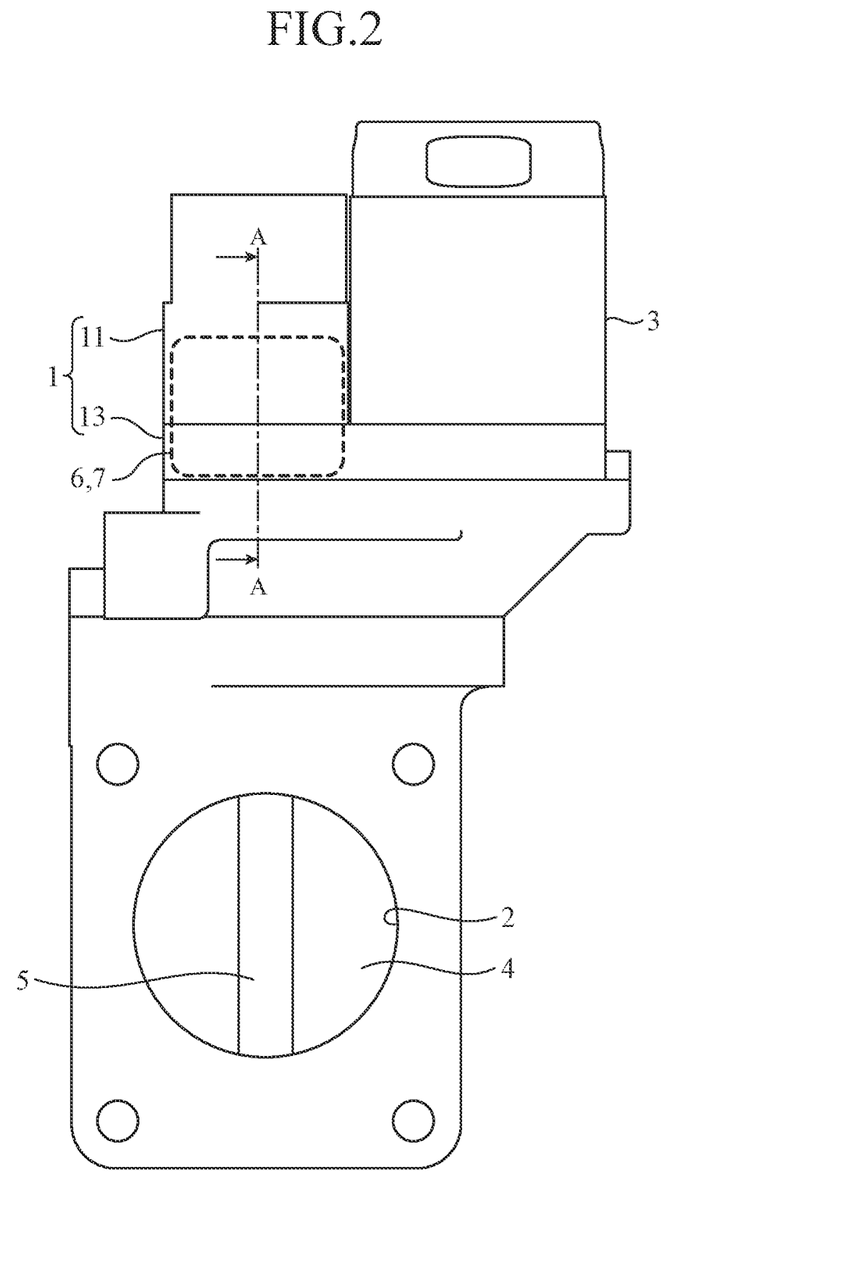
FIG. 2 is an external view showing the configuration of the butterfly valve to which the bearing holding structure according to Embodiment 1 is applied.

A bearing holding structure 7 shown in FIG. 1 is applied to, e.g., a butterfly valve shown in FIG. 2. FIG. 1 is a cross-sectional view obtained by cutting the butterfly valve along a line AA in FIG. 2, and shows the bearing holding structure 7 in a state mounted to the butterfly valve.

Hereinbelow, an example in which the butterfly valve shown in FIG. 2 is installed in an exhaust gas circulation passage to be used as an exhaust gas circulation valve that regulates a circulated exhaust gas flow rate will be described.

The butterfly valve includes a housing including an upper housing 11 and a lower housing 13, a fluid passage 2 that is formed in the lower housing 13 and communicates with the exhaust gas circulation passage, an actuator 3 that is fixed to the upper housing 11, a valve element 4 that opens and closes the fluid passage 2 to control a circulated exhaust gas amount, a support shaft 5 that causes the valve element 4 to operate, a bearing 6 that pivotally supports the support shaft 5 to be rotatable, and a bearing holding structure 7 that holds the bearing 6 in the housing 1. A driving force of the actuator 3 is transmitted to the support shaft 5 via a gear etc. that is not shown and the support shaft 5 is caused to perform rotating operation, whereby the valve element 4 opens and closes the fluid passage 2 to regulate the circulated exhaust gas amount.

In the surface of the upper housing 11 that opposes the lower housing 13 (the bottom surface of the upper housing 11 in FIG. 1), a recess 12 for installing the bearing 6 is formed.

As shown in FIG. 1, the bearing 6 is constituted mainly by an inner ring 61 that is fixed to the support shaft 5, an outer ring 62 that is press-fit into the inner peripheral surface of a sleeve 71 described later, and a plurality of rolling elements 63 that are interposed between the inner ring 61 and the outer ring 62. In addition, in order to hold the inner ring 61 of the bearing 6, one end of the inner ring 61 is abutted on a pipe 9 press-fit thereinto by the support shaft 5, the other end of the inner ring 61 is abutted on a plate 8 inserted thereinto by the support shaft 5 and fastened with a nut, to be thus sandwiched therebetween.

Figure 3:
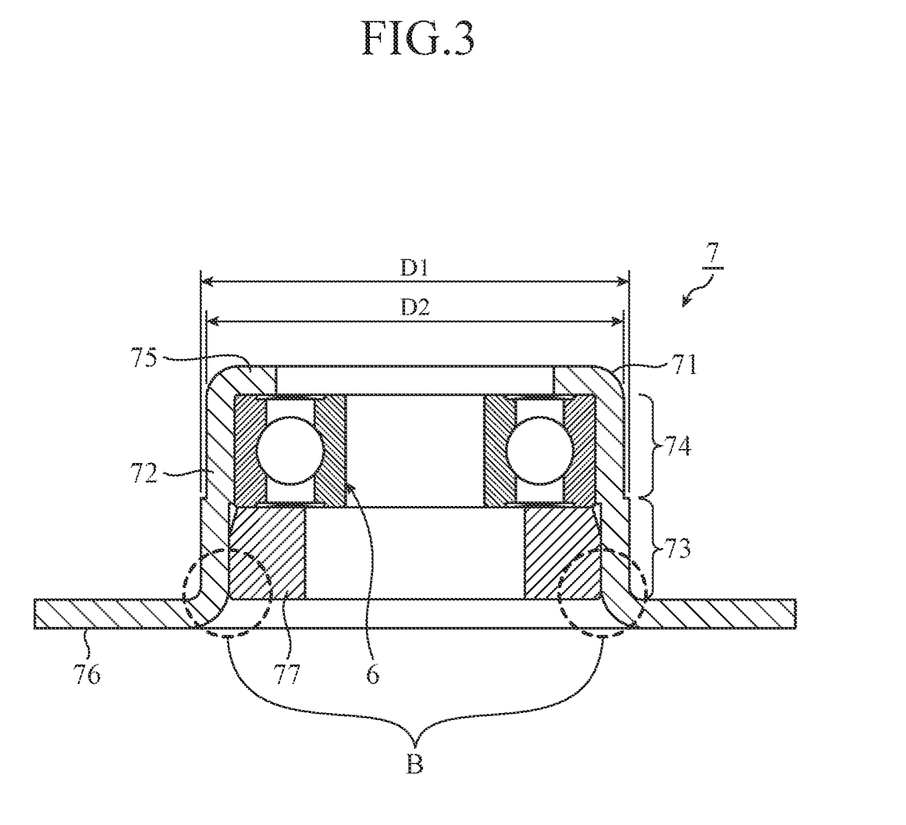
FIG. 3 is a cross-sectional view showing the configuration of the bearing holding structure according to Embodiment 1.
Figure 4:
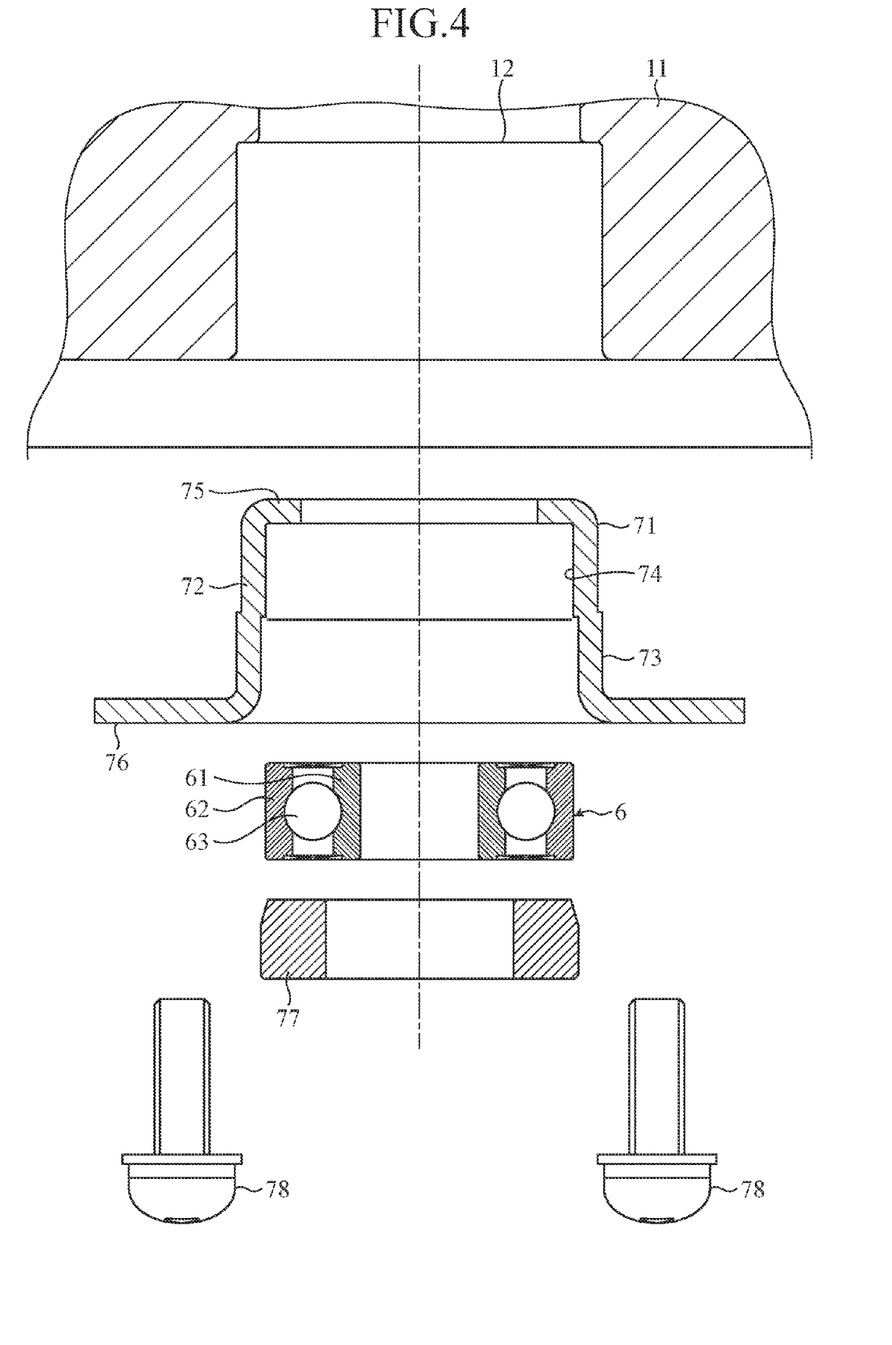
FIG. 4 is an exploded view showing the configuration of the bearing holding structure according to Embodiment 1.

Next, with reference to the cross-sectional views of FIGS. 1, 3, and 4, the bearing holding structure 7 will be described. Note that each drawing shows the cross section of the bearing holding structure 7 obtained by cutting the bearing holding structure 7 along the line AA of FIG. 2.

The bearing holding structure 7 has a substantially cylindrical sleeve 71 and a plate-shaped pressing plate 77. A tubular portion 72 of the sleeve 71 includes a housing press-fit portion 73 having an outer peripheral surface that is press-fit into a recess 12 of the upper housing 11, and a bearing press-fit portion 74 having an inner peripheral surface to be press-fit thereinto by the bearing 6. In addition, at one end of the tubular portion 72, a pullout prevention portion 75 that protrudes inward to prevent pullout of the bearing 6 is formed. The inner diameter of the pullout prevention portion 75 is set to be smaller than the outer diameter of the bearing 6, and the outer ring 62 of the bearing 6 is abutted and stopped on the pullout prevention portion 75.

When the outer ring 62 of the bearing 6 is press-fit into the tubular portion 72 in the sleeve 71, a high holding force is obtained. In addition, when the tubular portion 72 is lightly press-fit into the recess 12 of the upper housing 11, it is possible to position the bearing 6 with respect to the upper housing 11. Further, as shown in FIG. 3, it is configured such that the housing press-fit portion 73 and the bearing press-fit portion 74 are disposed at different positions in an axial direction, and that an outer diameter D2 of the bearing press-fit portion 74 is smaller than an outer diameter D1 of the housing press-fit portion 73. With the different outer diameters D1 and D2, even when the sleeve 71 is press-fit into the upper housing 11, a compressive load is not applied to the bearing 6.

Not that, the exhaust gas circulation valve is subjected to vibrations of a vehicle, and hence the exhaust gas circulation valve is required to have high vibration resistance. Accordingly, in order to further increase the holding force, the sleeve 71 may be press-fit and fixed into the upper housing 11, and then the sleeve 71 may be fastened using a screw 78. For example, at the end of the tubular portion 72 on the side opposite to the pullout prevention portion 75, a plate-shaped screwed portion 76 that protrudes outward to be screwed to the upper housing 11 is formed. The sleeve 71 is positioned and fixed to the upper housing 11 with the screwed portion 76, and easy and firm fixation is thereby allowed.

In addition, the exhaust gas circulation valve receives the heat of high-temperature exhaust gas that flows in the fluid passage 2, so that the bearing holding structure 7 is also subjected to a high temperature. To cope with this, in order to secure the high holding force even in an environment of vibrations and a thermal history, as the material of the sleeve 71, a stainless steel material (SUS) or a ferrous material having strength and a linear expansion coefficient close to those of a typical material of the bearing 6 may be used. With this, even in a severe use environment, it is possible to prevent misalignment and tilting of the bearing 6 and the support shaft 5.

In a more severe use environment, it is desirable to add the pressing plate 77 to the bearing holding structure 7. The pressing plate 77 is press-fit into the opening end of the sleeve 71 on the side opposite to the pullout prevention portion 75 to prevent the pullout of the bearing 6. Note that the inner diameter of the pressing plate 77 is set to be larger than the inner ring 61 of the bearing 6, and the pressing plate 77 is thereby caused to press only the outer ring 62 of the bearing 6.

When the stainless steel material (SUS) or the ferrous material is used as the material of the pressing plate 77 similarly to the sleeve 71, it is possible to secure the high holding force even in the environment of vibrations and the thermal history. Further, for the pullout prevention of the pressing plate 77 itself, the pressing plate 77 may be fixed to the sleeve 71 by caulking or welding (a caulking or welding position B shown in FIG. 3). With this, the strong holding force is obtained.

Next, the assembly procedure of the bearing holding structure 7 will be described.

First, the bearing 6 is press-fit into the inner peripheral surface of the sleeve 71 (the bearing press-fit portion 74), and the pressing plate 77 is further press-fit. Herein, for the pullout prevention, the sleeve 71 and the pressing plate 77 may be fixed to each other by performing caulking or welding. With this, the assembly of the bearing holding structure 7 as a Sub-Assy component is completed.

Subsequently, when the bearing holding structure 7 is mounted to the exhaust gas circulation valve, the outer peripheral surface of the sleeve 71 (the housing press-fit portion 73) different from the portion of the sleeve 71 into which the bearing 6 is press-fit (the bearing press-fit portion 74) is lightly press-fit into the recess 12 of the upper housing 11. Further, when the screwed portion 76 is screwed to the upper housing 11 with a plurality of the screws 78, the high holding force is secured.

Thus, the bearing holding structure 7 can be mounted from the side of the bottom surface of the upper housing 11 in one direction, and hence the bearing holding structure 7 can be adopted in the upper housing 11 having a shape in which one of vertical sides of the bearing 6 is closed.

In addition, the bearing holding structure 7 is mounted as the Sub-Assy component, and hence the assembly of a Complete-Assy is facilitated. Further, flexibility in mounting is high, and hence the configuration to the exhaust gas circulation valve is facilitated.

With the foregoing, according to Embodiment 1, the bearing holding structure 7 has the sleeve 71, and the sleeve 71 has the tubular portion 72 that is provided with the housing press-fit portion 73 having the outer peripheral surface to be press-fit into the upper housing 11 and the bearing press-fit portion 74 having the inner peripheral surface to be press-fit thereinto by the bearing 6, and the pullout prevention portion 75 that protrudes inward at one end of the tubular portion 72 to prevent the pullout of the bearing 6. Accordingly, when the bearing 6 is press-fit into the inner peripheral surface of the sleeve 71 to be held, the high holding force is obtained. In addition, when the outer peripheral surface of the sleeve 71 into which the bearing 6 is press-fit is press-fit into the upper housing 11, it is possible to perform the positioning of the bearing 6. Further, the mounting of the sleeve 71 to the upper housing 11 is performed from one direction, and hence it is possible to adopt the bearing holding structure 7 in the housing having the shape in which one side of the bearing 6 in the axial direction is closed.

In addition, according to Embodiment 1, the tubular portion 72 of the sleeve 71 has the shape such that the housing press-fit portion 73 and the bearing press-fit portion 74 are disposed at different positions in the axial direction, and that the outer diameter D2 of the bearing press-fit portion 74 is smaller than the outer diameter D1 of the housing press-fit portion 73, and hence the compressive load is not applied to the bearing 6.

Further, according to Embodiment 1, the sleeve 71 has the screwed portion 76 that protrudes outward at the end on the side opposite to the pullout prevention portion 75 to be screwed to the upper housing 11, and hence it is possible to fix the sleeve 71 to the upper housing 11 easily and firmly.

In addition, according to Embodiment 1, the sleeve 71 is formed of the stainless steel material or the ferrous material, and it is thereby possible to secure the high holding force even in the environment of vibrations and the environment of the thermal history.

In the case of the more severe use environment, it is possible to obtain a higher holding strength by adding to the bearing holding structure 7 the pressing plate 77 that is press-fit into the opening end of the sleeve 71 on the side opposite to the pullout prevention portion 75 to thus prevent the pullout of the bearing 6.

Further, according to Embodiment 1, the pressing plate 77 is formed of the same stainless steel material or ferrous material as that of the sleeve 71 and is fixed to the sleeve 71 by caulking or welding as the pullout prevention, and the strong holding force is thereby obtained.

Figure 5:
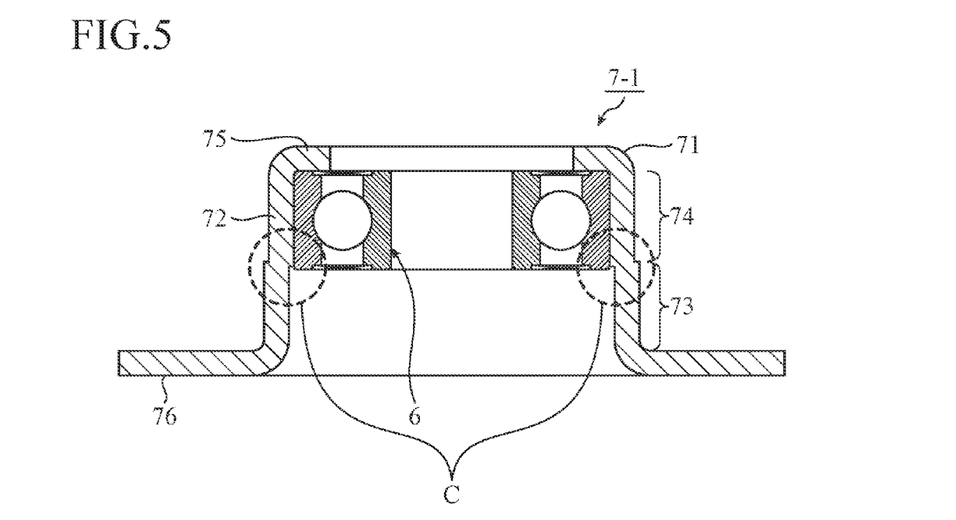
FIG. 5 is a cross-sectional view showing a variation of the bearing holding structure according to Embodiment 1.

Note that the pressing plate 77 is used in Embodiment 1, but the pressing plate 77 can be omitted. FIG. 5 shows an example of a bearing holding structure 7-1 in which the pressing plate 77 is not used.

In the case where the pressing plate 77 is not necessary, as the pullout prevention of the bearing 6, the bearing 6 may be fixed to the sleeve 71 by caulking or welding (a caulking or welding position C shown in FIG. 5). With this, the strong holding force as the pullout prevention is obtained.

Embodiment 2

Figure 6:
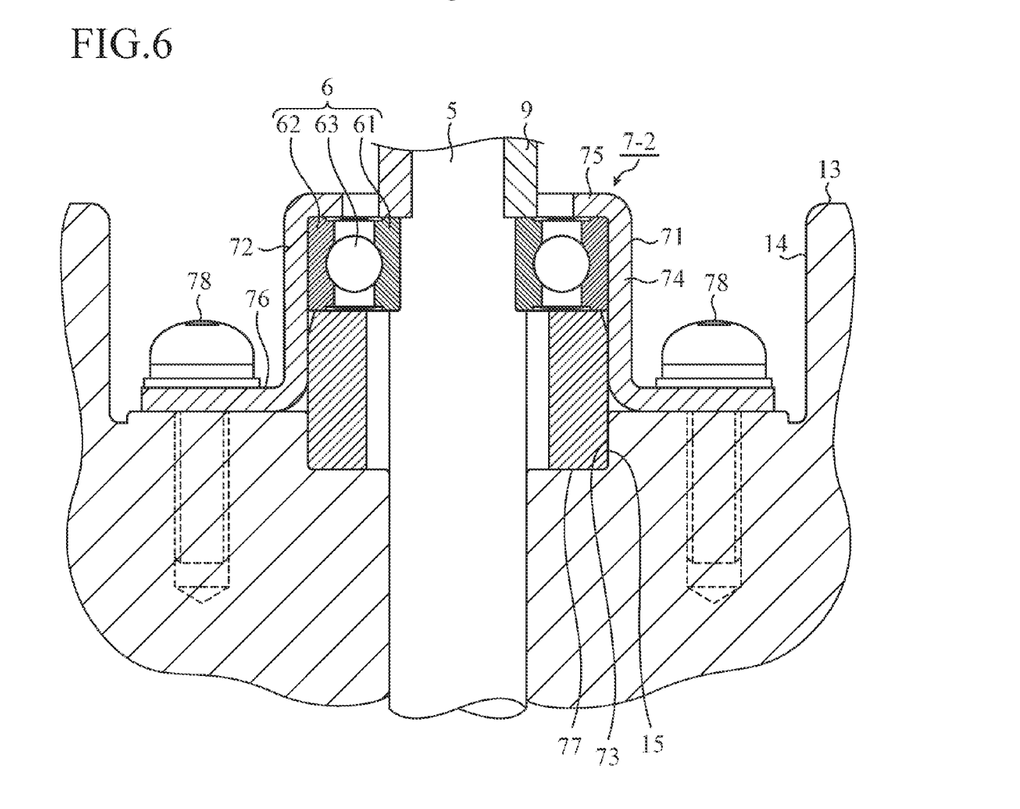
FIG. 6 is a cross-sectional view showing a state in which a bearing holding structure according to Embodiment 2 of the invention is mounted to a butterfly valve.
Figure 7:
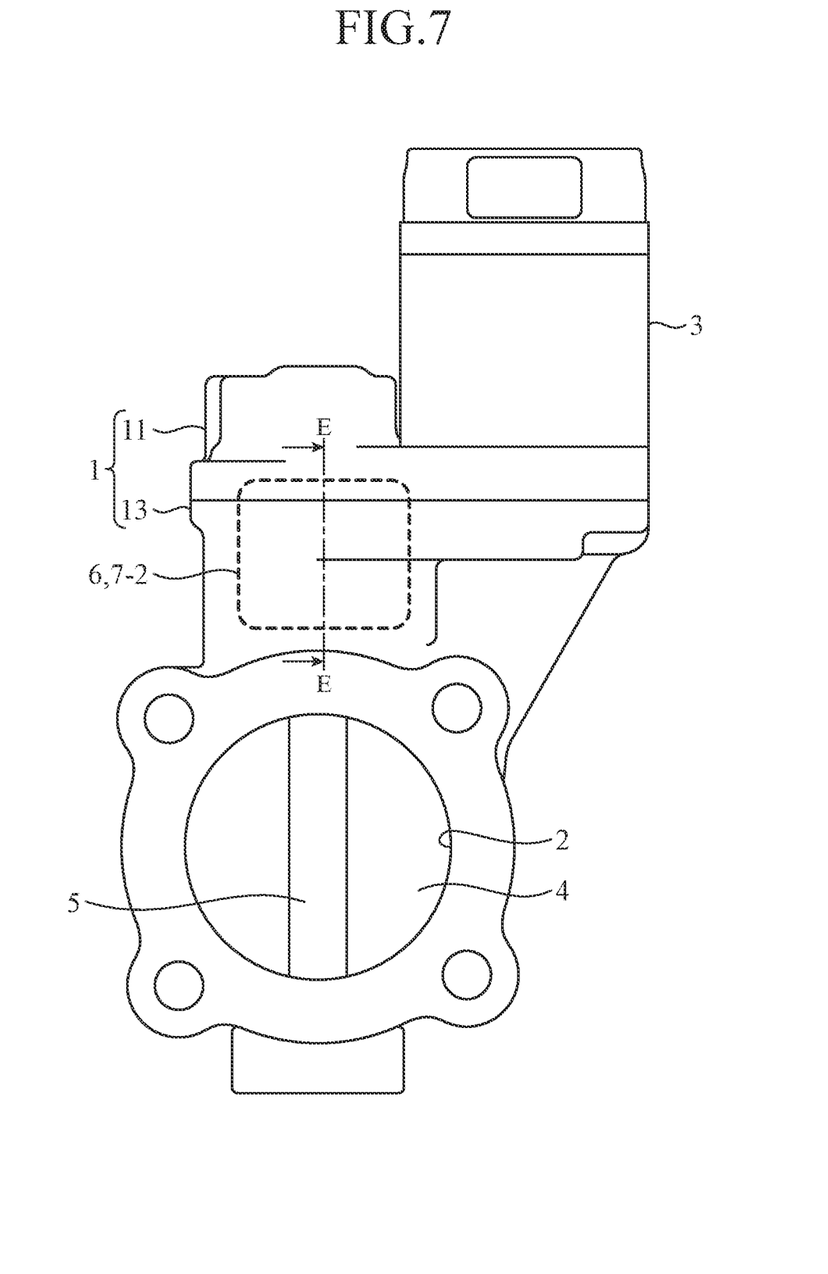
FIG. 7 is an external view showing the configuration of the butterfly valve to which the bearing holding structure according to embodiment 2 is applied.
Figure 8:
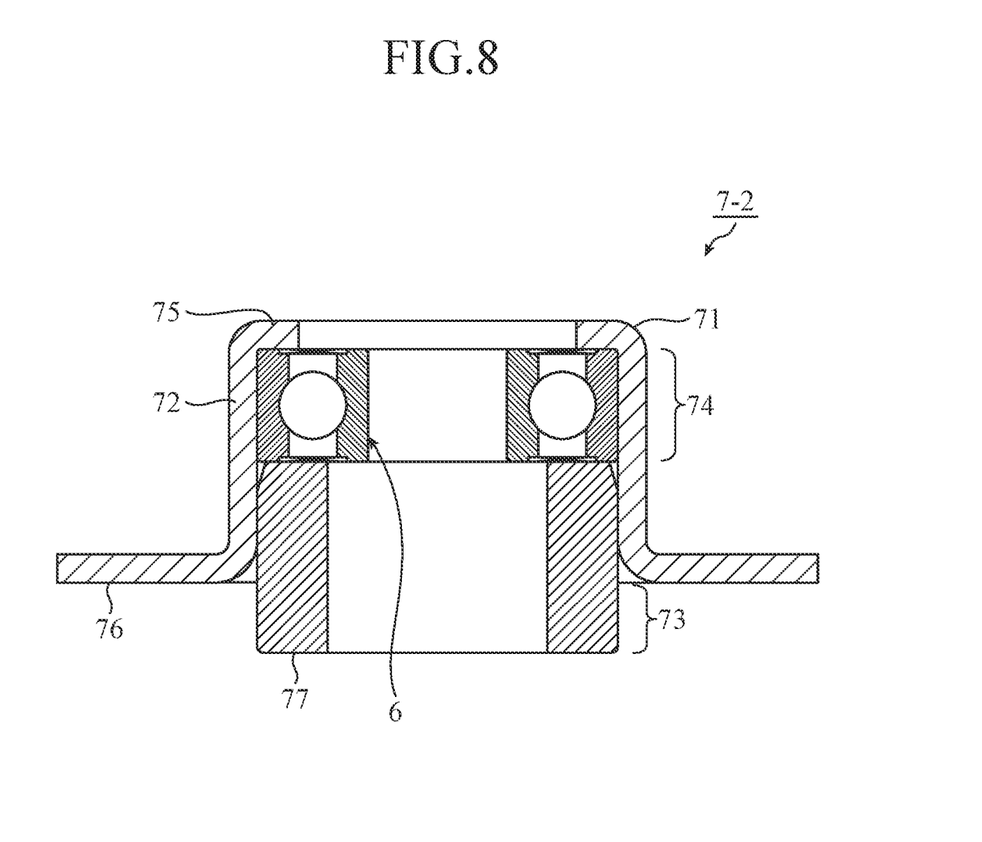
FIG. 8 is a cross-sectional view showing the configuration of the bearing holding structure according to Embodiment 2.
Figure 9:
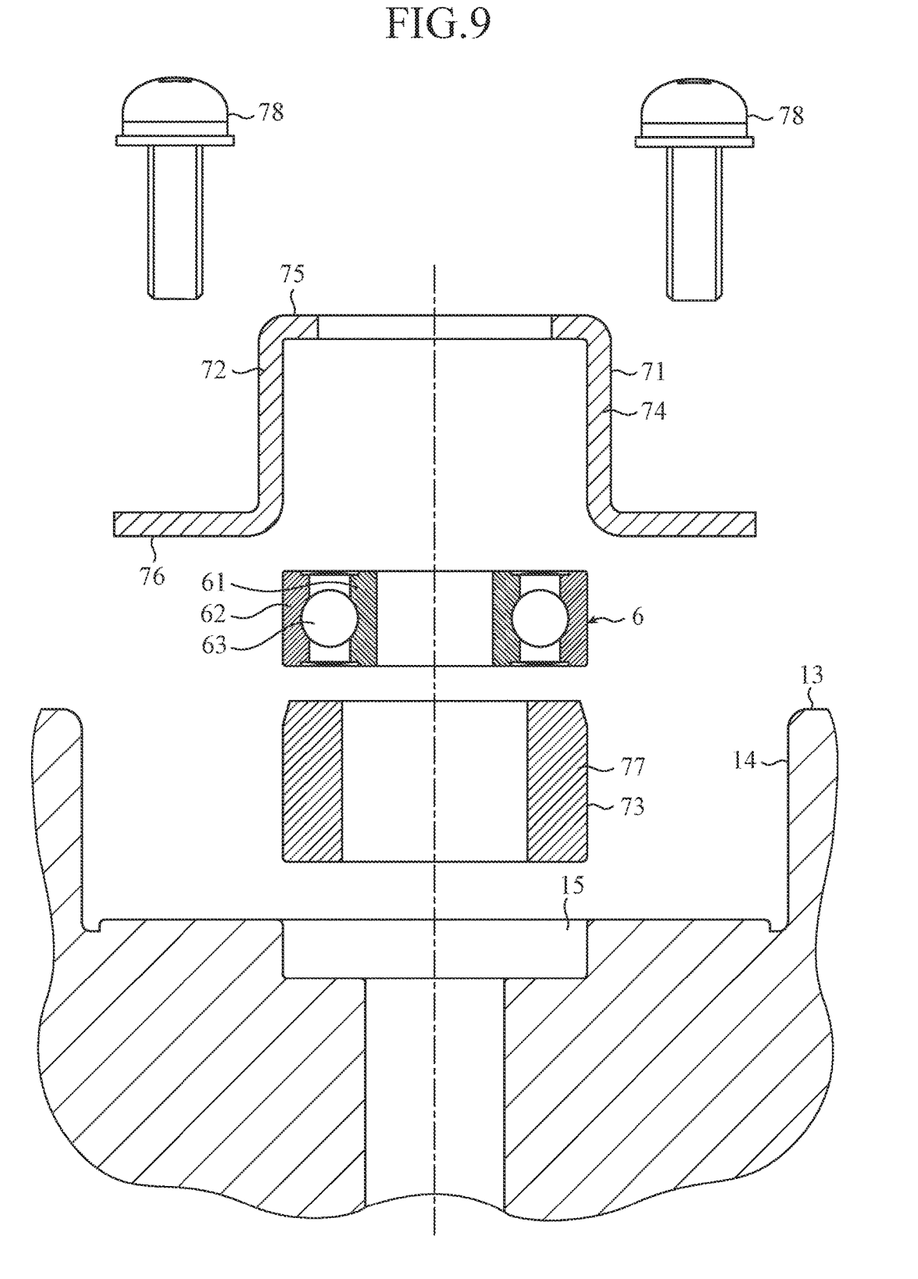
FIG. 9 is an exploded view showing the configuration of the bearing holding structure according to Embodiment 2.

A bearing holding structure 7-2 shown in FIG. 6 is applied to, e.g., a butterfly valve shown in FIG. 7. FIG. 6 is a cross-sectional view obtained by cutting the butterfly valve along a line EE in FIG. 7, and shows the bearing holding structure 7-2 in a state mounted to the butterfly valve. Each of FIGS. 8 and 9 shows the cross section of the bearing holding structure 7-2 obtained by cutting the bearing holding structure 7-2 along the line EE in FIG. 7.

The bearing holding structures 7 and 7-1 in the case where a bearing 6 is installed on the side of an upper housing 11 have been described in Embodiment 1 described above, and the bearing holding structure 7-2 in the case where the bearing 6 is installed on the side of a lower housing 13 will be described in Embodiment 2.

Note that, in FIGS. 6 to 9, portions identical or corresponding to those in FIGS. 1 to 5 are designated by the same reference numerals, and description thereof will be omitted.

A recess 14 for installing the bearing 6 is formed in the surface of the lower housing 13 that opposes the upper housing 11 (the upper surface of the lower housing 13 in FIG. 6), and a pressing plate fitting groove 15 is formed in the bottom surface of the recess 14.

The bearing holding structure 7-2 is constituted by a substantially cylindrical sleeve 71 and the tubular pressing plate 77. A tubular portion 72 of the sleeve 71 has the bearing press-fit portion 74 having the inner peripheral surface to be press-fit thereinto by the bearing 6. The outer peripheral surface of the pressing plate 77 on one end side is press-fit into the tubular portion 72 of the sleeve 71 to be held. The other end side protrudes from the opening end of the tubular portion 72 to the side of the lower housing 13, and the protruding portion forms a housing press-fit portion 73. When the outer peripheral surface of the housing press-fit portion 73 is lightly press-fit into the pressing plate fitting groove 15 of the lower housing 13, the bearing 6 is positioned with respect to the lower housing 13. In Embodiment 2, unlike embodiment 1 described above, it is not necessary to perform the positioning by press-fitting and fixing the outer peripheral surface of the sleeve 71 into the upper housing 11 (i.e., insertion or intermediate-fitting may be accepted), and hence the compressive load is not applied to the bearing 6; consequently, it is not necessary to make the outer diameters D1 and D2 of the sleeve 71 different from each other unlike FIG. 3.

Note that in the case where the bearing holding structure 7-2 is used in the environment of vibrations and a thermal history such as an exhaust gas circulation valve, similarly to Embodiment 1 described above, a stainless steel material (SUS) or ferrous material is used as the material of each of the sleeve 71 and the pressing plate 77.

Next, the assembly procedure of the bearing holding structure 7-2 will be described.

First, the bearing 6 is press-fit into the inner peripheral surface of the sleeve 71 (the bearing press-fit portion 74), and one end of the pressing plate 77 having a height that allows protrusion from the sleeve 71 in the axial direction is further press-fit thereinto. With this, the assembly of the bearing holding structure 7-2 as a Sub-Assy component is completed.

Subsequently, when the bearing holding structure 7-2 is mounted to the butterfly valve, the housing press-fit portion 73 of the pressing plate 77 that protrudes from the sleeve 71 is lightly press-fit into the pressing plate fitting groove 15 of the lower housing 13. In the rest of the procedure, similarly to Embodiment 1 described above, when the screwed portion 76 is screwed to the lower housing 13 with a plurality of the screws 78, a high holding force is secured.

With the foregoing, according to Embodiment 2, the bearing holding structure 7-2 is configured to have: the sleeve 71 that includes the tubular portion 72 having the inner peripheral surface to be press-fit thereinto by the bearing 6 and the pullout prevention portion 75 that protrudes inward on one end side of the tubular portion 72 to prevent the pullout of the bearing 6; and the pressing plate 77 that has one end side of the outer peripheral surface that forms the housing press-fit portion 73 to be press-fit into the pressing plate fitting groove 15 of the lower housing 13 and the other end of the outer peripheral surface that is press-fit into the opening end of the sleeve 71 on the side opposite to the pullout prevention portion 75 to thus prevent the pullout of the bearing 6. Accordingly, when the bearing 6 is press-fit into the inner peripheral surface of the sleeve 71 to be held, the high holding force is obtained. In addition, when one end side of the pressing plate 77 is press-fit into the inner peripheral surface of the sleeve 71 and the other end side thereof is press-fit into the lower housing 13, it is possible to perform the positioning of the bearing 6. Further, the mounting of the sleeve 71 and the pressing plate 77 to the lower housing 13 is performed from one direction, and hence it is possible to adopt the bearing holding structure in the housing having the shape in which one side of the bearing 6 in the axial direction is closed.

Note that it is possible to freely combine the embodiments, modify any components of the embodiments, or omit any components in the embodiments within the scope of the invention.

INDUSTRIAL APPLICABILITY

As described above, since the bearing holding structure according to the present invention is capable of securing the high holding force even in the environment of vibrations and thermal history, the bearing holding structure is suitable for use in the butterfly-type exhaust gas circulation valve or the like.

It will be easily understood that the bearing holding structure may also be used not only in the exhaust gas circulation valve but also in a flow rate control valve and a throttle valve.

DESCRIPTION OF REFERENCE NUMERALS AND SIGNS

1: housing
2: fluid passage
3: actuator
4: valve element
5: support shaft
6: bearing
7, 7-1, 7-2: bearing holding structure
8: plate
9: pipe
11: upper housing
12, 14: recess
13: lower housing
15: pressing plate fitting groove
61: inner ring
62: outer ring
63: rolling element
71: sleeve
72: tubular portion
73: housing press-fit portion
74: bearing press-fit portion
75: pullout prevention portion
76: screwed portion
77: pressing plate
78: screw

The invention claimed is:

1. A bearing holding structure for a butterfly valve, the butterfly valve including a housing formed with a fluid passage in an internal portion thereof, a valve element that opens and closes the fluid passage, a support shaft that causes the valve element to operate, and a bearing that pivotally supports the support shaft to be rotatable, the bearing holding structure comprising:
   a sleeve including a tubular portion provided with a bearing press-fit portion having an inner peripheral surface receiving the bearing with a press-fit and a pullout prevention portion that protrudes inward on one end side of the tubular portion and prevents pullout of the bearing; and
   a pressing plate having one end side of an outer peripheral surface that forms a housing press-fit portion which is press-fit into the housing and another end side of the outer peripheral surface that is press-fit into an opening end of the sleeve on a side opposite to the pullout prevention portion and prevents pullout of the bearing, wherein the housing press-fit portion is press-fit into a fitting groove formed in the housing.

2. The bearing holding structure for a butterfly valve according to claim 1, wherein
   the sleeve has a screwed portion that protrudes outward at an end on a side opposite to the pullout prevention portion to be screwed to the housing.

3. The bearing holding structure for a butterfly valve according to claim 1, wherein
   the sleeve is formed of a stainless steel material or a ferrous material.

4. The bearing holding structure for a butterfly valve according to claim 1, wherein
   the pressing plate is formed of a stainless steel material or a ferrous material.

5. The bearing holding structure for a butterfly valve according to claim 1, wherein
the sleeve and the pressing plate are fixed to each other by caulking or welding.

6. The bearing holding structure for a butterfly valve according to claim 1, wherein
the sleeve and the bearing are fixed to each other by caulking or welding.

7. The bearing holding structure for a butterfly valve according to claim 1, wherein
the bearing holding structure is used in an exhaust gas circulation valve installed in an exhaust gas circulation passage of a vehicle.

8. The bearing holding structure of claim 1 wherein said pressing plate is press fit into the inner peripheral surface of said sleeve to secure the bearing into the sleeve.

\* \* \* \* \*